(12) United States Patent
Wei

(10) Patent No.: US 11,392,147 B1
(45) Date of Patent: Jul. 19, 2022

(54) SELF-ENERGIZED PROGRAMMABLE TIMER CONTROL VALVE SYSTEM

(71) Applicant: Frank Wei, Valencia, CA (US)

(72) Inventor: Frank Wei, Valencia, CA (US)

( * ) Notice: Subject to any disclaimer, the term of this patent is extended or adjusted under 35 U.S.C. 154(b) by 0 days.

(21) Appl. No.: 17/574,199

(22) Filed: Jan. 12, 2022

(51) Int. Cl.
| | |
|---|---|
| *G05D 7/01* | (2006.01) |
| *A01G 25/16* | (2006.01) |
| *F16K 21/16* | (2006.01) |
| *F23N 5/20* | (2006.01) |
| B05B 12/02 | (2006.01) |
| E03B 7/07 | (2006.01) |

(52) U.S. Cl.
CPC ............ *G05D 7/01* (2013.01); *A01G 25/165* (2013.01); *F16K 21/16* (2013.01); *F23N 5/20* (2013.01); *B05B 12/02* (2013.01); *E03B 7/07* (2013.01); *Y10T 137/86389* (2015.04); *Y10T 137/86397* (2015.04); *Y10T 137/86405* (2015.04); *Y10T 137/86413* (2015.04)

(58) Field of Classification Search
CPC ........ G05D 7/01; A01G 25/165; F16K 21/16; F23N 5/20; B05B 12/02; E03B 7/07; Y10T 137/86397; Y10T 137/86389; Y10T 137/86405; Y10T 137/86413
See application file for complete search history.

(56) References Cited

U.S. PATENT DOCUMENTS

| | | | | |
|---|---|---|---|---|
| 2,545,928 A | * | 3/1951 | Martin ..................... | F16K 21/16 239/70 |
| 3,547,154 A | * | 12/1970 | Benham ............... | A01G 25/162 239/70 |
| 3,874,412 A | * | 4/1975 | Fleckenstein ............. | C02F 1/42 74/3.52 |
| 4,003,402 A | * | 1/1977 | Corliss .................. | A01G 25/165 239/66 |
| 4,130,135 A | * | 12/1978 | Moore .................. | A01G 25/165 239/70 |
| 4,526,198 A | * | 7/1985 | Scott ..................... | A01G 25/162 239/70 |
| 4,708,264 A | | 11/1987 | Bruninga | |
| 5,033,509 A | * | 7/1991 | Tsai ........................ | F16K 31/48 251/238 |
| 5,078,178 A | * | 1/1992 | Jang ...................... | G01F 15/001 251/15 |
| 5,309,942 A | | 5/1994 | Orii et al. | |
| 5,590,687 A | * | 1/1997 | Vaughan ................... | C02F 1/42 137/624.13 |
| 5,782,578 A | | 7/1998 | Yang | |
| 5,806,556 A | | 9/1998 | Johnson | |
| 6,354,172 B1 | * | 3/2002 | Piacenza ................. | F16K 31/48 74/567 |
| 6,397,888 B1 | * | 6/2002 | Wang .................... | A01G 25/165 137/883 |
| 6,398,185 B1 | * | 6/2002 | Wang .................... | G05D 7/0106 251/249 |

(Continued)

*Primary Examiner* — Matthew W Jellett
*Assistant Examiner* — Christopher D Ballman

(57) ABSTRACT

A self-energized programmable timer valve is provided in embodiments of this invention that can be used in watering and other systems, such as lawn watering systems and agricultural watering systems. The invention provides one or more components that serve the functions of a clock, a valve and an energizer (e.g., turbine) (i.e., a clock function, a valve function, and an energizing and/or turbine function) to control the flow of media (e.g., water) through the valve.

17 Claims, 4 Drawing Sheets

(56) References Cited

U.S. PATENT DOCUMENTS

| | | | |
|---|---|---|---|
| 6,986,364 B1 * | 1/2006 | Wang | A01G 25/165 239/70 |
| 7,252,113 B2 * | 8/2007 | Jacobs | A01G 25/165 137/624.21 |
| 7,404,415 B2 | 7/2008 | Jacobs et al. | |
| 7,509,973 B1 * | 3/2009 | Deive | F16K 17/34 251/74 |
| 2007/0074767 A1 | 4/2007 | Roffey | |

* cited by examiner

SELF-ENERGIZED PROGRAMMABLE TIMER CONTROL VALVE SYSTEM

FIELD OF THE INVENTION

The invention relates to a control valve for water and other media that is programmable and self-energized and methods for using such.

BACKGROUND OF THE INVENTION

Valves, such as water valves, have several different useful applications, such as for controlling the flow of water to lawn sprinklers or agricultural watering. Several types have been used in the past. Some of these are programmable. These include electrical solenoid-controlled sprinklers. In these electrical solenoid-based systems the control valves and programmable controllers are piped and wired together to save electrical wiring cost and so that they need to be placed near a common water and electricity source, requiring the use of electrical service and extensive pipelines.

In alternative battery powered systems, the valves do not always need to be piped together but they are generally limited to being used for small watering areas and the batteries must be changed frequently due to the high energy consumption of the valve open/close actions.

There are also mechanical countdown valves that do not require electrical wiring or batteries. However, these mechanical countdown valves require manual operation to hand-turn the mechanism each time watering is desired. They also often work for limited times less than 120 minutes or so.

Improved valves with certain functions and/or properties are needed. Such improvement, function and/or property could be a valve system that is programmable as to the time when it is open and closed. Another improvement, function and/or property could be a programmable valve system that does not require an electrical connection or extensive pipelines. Another improvement, function and/or property could be a programmable valve system that does not require batteries. Still another improvement, function and/or property could be a programmable valve system that does not require manual operation each time watering is desired. Still another improvement, function and/or property could be a programmable valve system that is self-energizing utilizing the flow pressure of the media, such as water, passing through the valve. Still another improvement, function and/or property could be a programmable valve system that can be used in remote locations without electrical service nearby and with a minimum amount of human input needed for it to operate. It would therefore be advantageous if there were a self-energized programmable timer control valve system available with some or all of these improvements, functions and/or properties.

SUMMARY OF THE INVENTION

A self-energized programmable timer control valve system is provided in embodiments of this invention. In preferred embodiments, the valve system programs watering time with a mechanical clock apparatus and/or mechanism with an hour dial and a minute dial, converts sequential rotation movements of the dials to a linear movement to open/close the valve gate (or valve plunger or valve plug component), and mechanically energizes the clock with an energizer apparatus or mechanism such as a turbine apparatus. Such a system can be used to minimize and/or avoid relying solely on batteries or an electrical service connection, laying wire to the field, or requiring the laying of extensive runs of pipe, and thus it can be less expensive, require less maintenance, and be used in a remote area without significant human attention or mechanical and/or electrical utility development.

The components of embodiments of this invention include, but are not limited to, a valve and plunger apparatus (sometimes referred to herein as a "valve" or valve apparatus that may include a valve plug component) that controls the flow of media, including liquids such as water. It also includes a clock apparatus (sometimes referred to herein as a "clock") that can be part of or separate from the valve and plunger apparatus. It also includes an energizer apparatus (sometimes referred to herein as an "energizer") that can be part of or separate from the valve and plunger apparatus. A preferred embodiment of an energizer apparatus of this invention is a turbine apparatus (sometimes referred to herein as a "turbine"). In particularly preferred embodiments of this invention, the valve and plunger apparatus, the clock apparatus and the energizer apparatus are provided in the same housing.

In particularly preferred embodiments of this invention, a valve system is provided for controlling the flow of media such as water. The valve system comprises a clock apparatus that is connected to a valve plug component by a first connecting apparatus and which clock apparatus performs a timing function that controls the amount of time the valve is open and closed by changing the position of the first connecting apparatus. The valve system also comprises an energizer apparatus connected to the clock apparatus by a second connecting apparatus and which energizer apparatus performs a mechanical energizing function that provides mechanical energy to the clock apparatus via the second connecting apparatus, the energizer apparatus generating at least some of its own mechanical (as opposed to electrical) energy and not being connected to an electrical service. The valve system also comprises a valve plug component that is connected to the clock apparatus by the first connecting apparatus and which valve plug component controls the flow of media through the valve system (and past the valve plug component), said valve plug component being controlled by the clock apparatus and the first connecting apparatus.

In these particularly preferred embodiments, the clock apparatus comprises a mechanical clock mechanism with an hour dial and a minute dial and the first connecting apparatus comprises a double-cam mechanism that is functionally connected to the valve plug component. The double-cam mechanism is capable of converting rotational movement of the hour dial and the minute dial to linear movement of the valve plug component to open and close the valve and control the flow of media through it.

In these same particularly preferred embodiments, the energizer apparatus comprises a turbine apparatus, the turbine apparatus comprising a turbine shaft, an impeller on one end of the turbine shaft that is capable of being turned by the flow of media, and a torque limiter that is capable of disengaging the turbine shaft from the impeller. The second connecting apparatus comprises one or more gears or belts (or other non-electrical energy transfer components) on one end that are capable of transferring rotational energy to the clock apparatus to energize the clock apparatus.

The invention also includes a method of controlling the flow of media, such as water, through a valve comprising a valve plug component. In particularly preferred embodiments, the method comprises programming a clock apparatus with the time the valve plug component is to be opened and/or closed; converting the programming of the clock apparatus using a first connecting apparatus to the opening and/or closing of the valve plug component; and energizing the clock apparatus by a mechanical energizer apparatus comprising a turbine apparatus that transfers mechanical energy from the flow of media through the valve to the clock apparatus thereby energizing the clock apparatus.

In these particularly preferred embodiments of this method, the clock apparatus comprises a mechanical clock mechanism with an hour dial and a minute dial. The first connecting apparatus comprises a double-cam mechanism that is connected to the valve plug component and the double-cam mechanism is capable of converting rotational movement of the hour dial and the minute dial to linear movement of the valve plug component to open and/or close the valve and control the flow of media through it.

A preferred control valve system of this invention (e.g., that may be used as a control system for a water sprinkler or component of an irrigation system, and which may or may not be contained in a single, discrete housing having a water inlet and a water outlet) comprises the following:

(1) a clock apparatus that comprises a mechanical clock mechanism with an hour dial and a minute dial, the clock apparatus being connected to a valve plug component having an open position and a closed position, the clock apparatus being connected to the valve plug component by a first connecting apparatus, and which clock apparatus performs a timing function that controls the amount of time the valve plug component is in the open position and/or the closed position.

(2) wherein the first connecting apparatus functions to convert the rotational movement of the hour dial and the minute dial to a linear movement of the valve plug component to the open position and/or closed position and control the flow of media through the control valve system.

(3) a turbine apparatus, the turbine apparatus comprising a turbine shaft, an impeller on one end of the turbine shaft that is capable of being turned by the flow of media, and an optional torque limiter that is capable of disengaging the turbine shaft from the impeller, the turbine apparatus being connected to the clock apparatus by a second connecting apparatus, and which turbine apparatus provides a mechanical energizing function that provides mechanical energy to the clock apparatus by using the second connecting apparatus.

In one particular embodiment of the control valve system set forth above, the first connecting apparatus comprises a cam mechanism that is connected to the valve plug component, the cam mechanism having at least one cam being capable of converting rotational movement of the hour dial or the minute dial to linear movement of the valve plug component to the open position and/or the close position and control the flow of media through the control valve system.

In an alternative embodiment of the control valve system set forth above, the first connecting apparatus comprises a double-cam mechanism, the double-cam mechanism having a first cam being engaged with the hour dial, and a second cam being capable of being engaged with the minute dial, wherein when the hour dial is set to a particular time of the hour(s), the first cam works sequentially with the second cam to enable the second cam to engage with the minute dial and change the position of the valve plug component to the open position and/or the closed position for the length of time set by the hour dial and the minute dial.

In still another alternative embodiment of the control valve system set forth above, the first connecting apparatus comprises a double-cam mechanism, the double cam mechanism having a first cam being engaged with the hour dial, and a second cam being engaged with the minute dial, wherein when the hour dial is set to a particular time of the hour(s), the first cam works sequentially with the second cam to lock the second cam to a shaft that connects the double-cam mechanism to the valve plug component to change the position of the valve plug component to the open position and/or closed position for the length of time set by the hour dial and the minute dial.

A preferred method of controlling the flow of media such as water through a valve system of this invention comprises the following steps:

(1) programming a clock apparatus with the time the valve plug component is to be opened and/or closed, the clock apparatus comprising a mechanical clock mechanism with an hour dial and a minute dial, wherein the hour dial is divided into no more than 24 equal sections, each of which sections is capable of engaging a first connecting apparatus to move the valve plug component to the open position for the time of the hour(s) set on the hour dial, and wherein the minute dial is divided into no more than 60 equal sections, each of which sections is capable of engaging the first connecting apparatus to move the valve plug component to the open position for the number of minutes set on the minute dial.

(2) converting the programming of the clock apparatus using the first connecting apparatus that translates the rotational movement of the hour dial and the minute dial to a linear movement of the valve plug component to change the position of the valve plug component to an open position and/or a closed position and thereby control the flow of media past the valve plug component.

(3) energizing the clock apparatus by a turbine apparatus, the turbine apparatus comprising a turbine shaft, an impeller on one end of the turbine shaft that is capable of being turned by the flow of media, and an optional torque limiter that is capable of disengaging the turbine shaft from the impeller, the turbine apparatus being connected to the clock apparatus by a second connecting apparatus, and which turbine apparatus provides a mechanical energizing function that winds up the mainspring of the clock to provide mechanical energy to the clock apparatus using the second connecting apparatus.

In one particular embodiment of the preferred method set forth above, the first connecting apparatus comprises a cam mechanism that is connected to the valve plug component, the cam mechanism having at least one cam being capable of converting rotational movement of the hour dial or the minute dial to linear movement of the valve plug component to change the position of the valve plug component to the open position and/or the closed position and thereby control the flow of media past the valve plug component.

In an alternative embodiment of the preferred method set forth above, the first connecting apparatus comprises a double-cam mechanism comprising a first cam and a second cam, the double-cam mechanism being connected to the valve plug component, wherein the double-cam mechanism is capable of converting rotational movement of the hour dial and the minute dial to linear movement of the valve plug component to change the position of the valve plug component to an open position and/or closed position and thereby control the flow of media past the valve plug component.

In still another alternative embodiment of the preferred method set forth above, the hour dial is divided into no more than 24 hour sections and is connected to and capable of engaging the first cam for the time of the hour(s) set on the hour dial; and wherein the minute dial is divided into no more than 60 minute sections or group of minutes sections and is connected to and capable of engaging the second cam for the number of minutes set on the minute dial.

An object of this invention is to provide a valve system that is programmable as to the time when it is open and closed. Another object of this invention is to provide a programmable valve system that does not require an electrical connection or extensive pipelines. Another object of this invention is to provide a programmable valve system that does not require batteries. Still another object of this invention is to provide a programmable valve system that does not require manual operation each time watering is desired. Still another object of this invention is to provide a programmable valve system that is self-energizing and that can be driven by the media, including liquids such as water, flow through the valve. Still another object of this invention is to provide a programmable valve system that can be used in remote locations without electrical service nearby and with a minimum amount of human input needed for it to operate. It would therefore be advantageous if there were a self-energized programmable timer control valve system available with some or all of these objects. Some or all of these objects and advantages, as well as other objects and advantages, can be achieved by embodiments of the invention.

Additional features and advantages of various embodiments will be set forth in part in the description that follows, and in part will be apparent from the description, or may be learned by practice of various embodiments. The objectives and other advantages of various embodiments will be realized and attained by means of the elements and combinations particularly pointed out in the description and appended claims.

DETAILED DESCRIPTION OF THE INVENTION

A self-energized programmable timer control valve system is provided in embodiments of this invention that can be used in watering and other systems, such as lawn watering systems and agricultural watering systems. Other applications include any system that uses a valve to control the flow of a liquid and/or other media.

In this invention, one or more components serve the functions of a clock, a valve and an energizer (e.g., turbine) (i.e., a clock function, a valve function, and an energizing and/or turbine function). These functions can be performed by one component, or two or more components connected mechanically to each other or within one component. The single component or multiple components that are capable of performing these functions can be provided in one housing or multiple housings. Thus, embodiments of this invention can be described with equal applicability as a valve system comprising (a) a valve apparatus connected to a clock apparatus and an energizer or turbine apparatus, or (b) a valve apparatus that includes or contains a clock apparatus and/or an energizer or turbine apparatus.

There is at least one input for media, such as a liquid (e.g., water), and at least one media output, in the embodiments of this invention.

In embodiments of this invention, a clock with a control mechanism is connected to the valve. This clock is preferably run by a mechanical control mechanism.

In certain preferred embodiments, a mechanical clock mechanism with an hour dial and a minute dial is used that can program the water flow (e.g., watering by sprinklers) time by determining when the valve stays open and/or closed. These embodiments use a regular or standard mechanical clock mechanism instead of the countdown timer used in mechanical countdown valves.

The clock that is used in certain of these embodiments uses an hour dial and a minute dial. The hour dial has 12 repositioning up/down tabs and the minute dial has 60 repositioning in/out tabs so that the watering time can be programmed by setting the tabs' positions. For example, the hour tab can be set at 7 pm and five of the minute tabs can be set so the valve is programmed to start watering for 5 minutes at 7 pm. Other clocks can be used for the invention, as will be apparent to a person skilled in the art.

Figure 1:
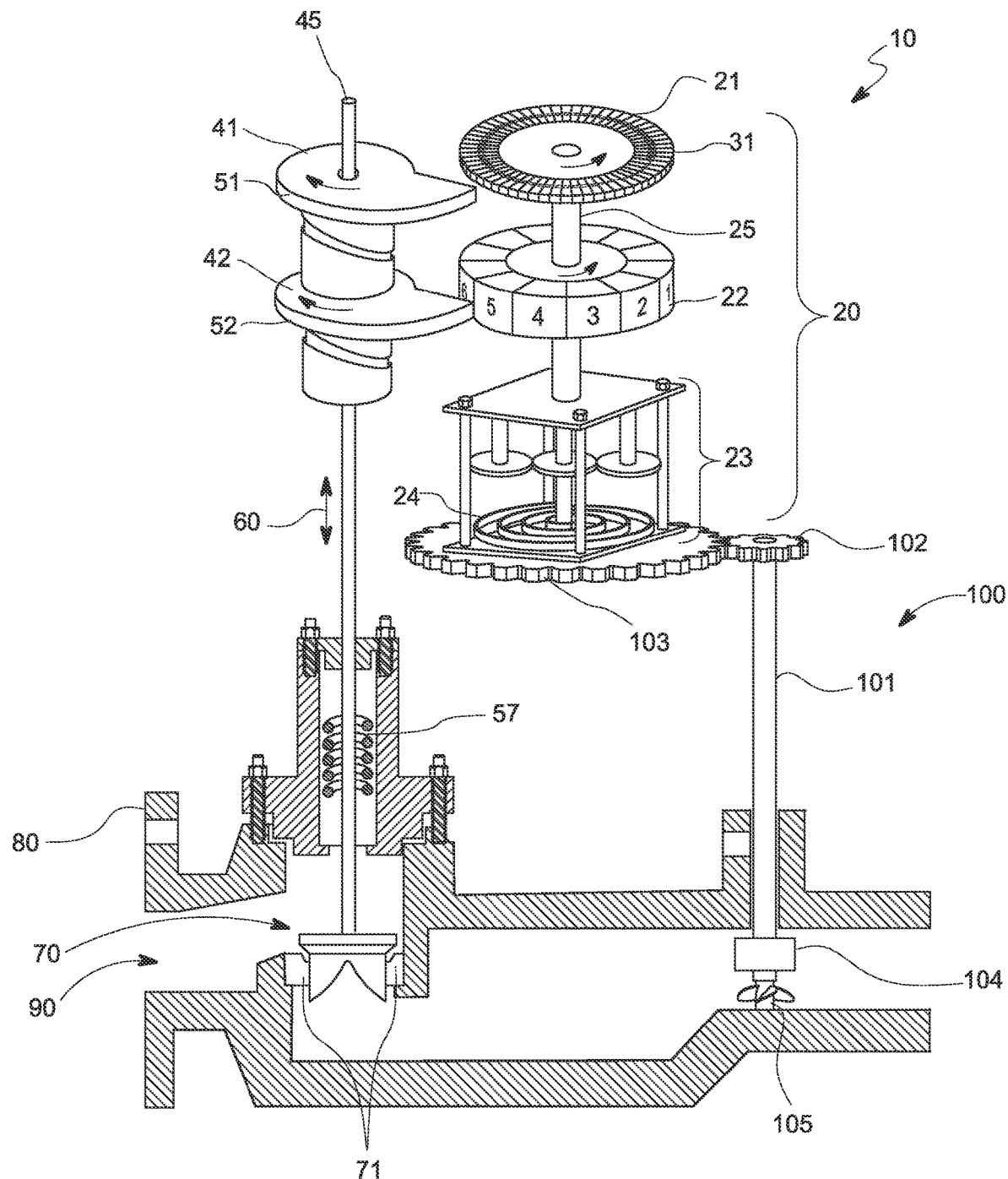
FIG. 1 is a partial perspective, cross section, and cut away view of certain embodiments of this invention showing portions of a valve and plunger apparatus (also referred to as a valve apparatus and/or a valve apparatus with a valve plug component), clock apparatus, double cam components as a first connecting apparatus, and turbine apparatus of this invention with certain of the components illustrated and the water flow indicated with an arrow when in operation.

FIG. 1 is a partial perspective and cut away view of certain embodiments of this invention showing, among other things, portions of a valve apparatus 10 and portions of a clock apparatus 20. In these embodiments, there is a minute dial 21, an hour dial 22, a mechanical clock mechanism 23, and a clock mainspring 24. A dial shaft 25 or other mechanism connects the dials 21, 22 to the mechanical clock mechanism 23. A plunger shaft 45 (also called cam shaft in certain embodiments herein and which may be part of or connected to the first connecting apparatus in some embodiments, or connected to the dial shaft) is connected to a valve plug component 70 that is placed in a seat 71 when the valve is not open.

Figure 2:
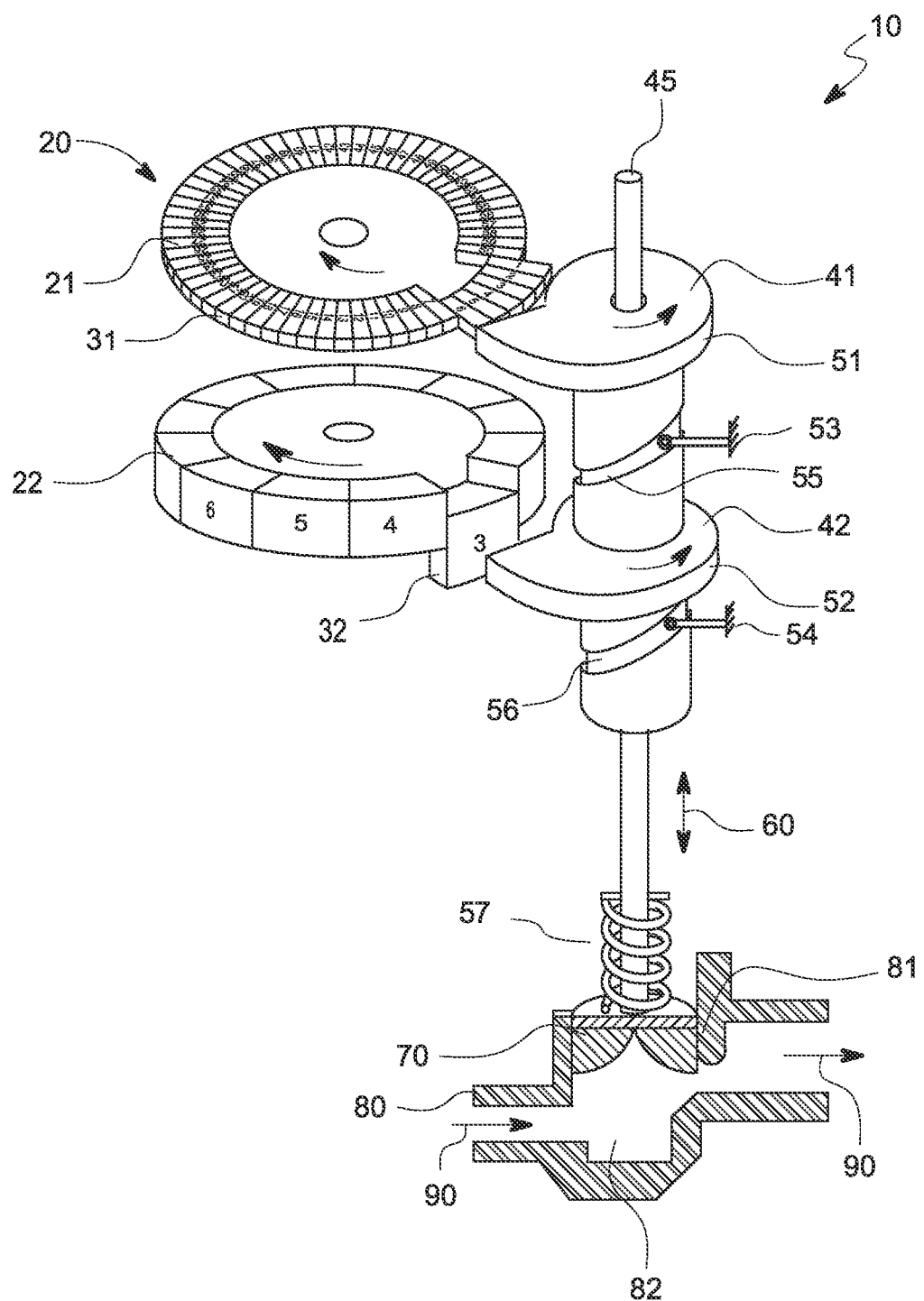
FIG. 2 is a partial perspective and cut away view of certain embodiments of this invention showing a valve and plunger apparatus (also referred to as valve apparatus and/or a valve apparatus with a valve plug component) and double cam components of a first connecting apparatus and the minute and hour dials of a clock apparatus of this invention with certain of the components illustrated and the water flow indicated with an arrow when in operation.

FIG. 2 is a partial perspective and cut away view of certain embodiments of this invention showing, among other things, portions of a valve apparatus 10 and portions of a clock apparatus 20. In these embodiments, there is a minute dial 21 with sixty tabs 31 (each of the sixty representing one minute time interval), and an hour dial 22 with twelve tabs 32 (each of the twelve representing one-hour time interval). A first wedge cam 42 that freely rotates around the shaft 45 and goes up/down guided by the positing pin 54 interacts with the hour dial 22 tabs 32 for the purpose to move the second wedge cam 41 up and down. The second wedge cam 41 is fixed to the shaft 45. When wedge cam 41 interacts with the minute dial 21 tabs 31 the cam shaft 45 will be moved up and down guided by the positioning pin 53. In this manner, in operation rotational movement 51, 52 of the cams 41, 42 is translated to linear movement 60 of the cam shaft 45.

The first connecting apparatus of this invention connects the clock apparatus to the valve plug component and it can be comprised of a number of components familiar to a person of skill in the art, such as one or more shafts, connecting pins, gears and/or pulleys and other devices that are connected together to transfer mechanical energy and mechanically programmed timing information from the clock apparatus to the valve plug component. One such group of embodiments comprises a cam mechanism having at least one cam being capable of converting rotational movement of the hour dial or the minute dial to linear movement of the valve plug component to the open or closed position and after the length of time set by the hour dial or the minute dial the minute tabs are disengaged from the first cam, the shaft is pushed back to the original position by the spring 57. Thus, the flow of media is controlled as programed through the control valve system (i.e., flow of media past the valve plug component).

Another such group of embodiments comprises a double-cam mechanism having a first cam being engaged with the hour dial, and a second cam being capable of being engaged with the minute dial, wherein when the hour dial is set to a particular time of the hour(s), the first cam works sequentially with the second cam to enable the second cam to engage with the minute dial and change the position of the valve plug component to the open or closed position and after the length of time set by the hour dial and the minute dial the minute tabs are disengaged from the first cam, the shaft is pushed back to the original position by the speing 55. Thus, the flow of media is controlled as programed through the control valve system (i.e., flow of media past the valve plug component).

Still another such group of embodiments comprises a double cam mechanism having a first cam being engaged with the hour dial, and a second cam being engaged with the minute dial, wherein when the hour dial is set to a particular time of the hour(s), the first cam works sequentially with the second cam to lock the second cam to a shaft that connects the double-cam mechanism to the valve plug component to change the position of the valve plug component to the open or closed position and after the length of time set by the hour dial and the minute dial the minute tabs are disengaged from the first cam, the shaft is pushed back to the original position by the speing 57. Thus, the flow of media is controlled as programed through the control valve system (i.e., flow of media past the valve plug component).

Figure 3:
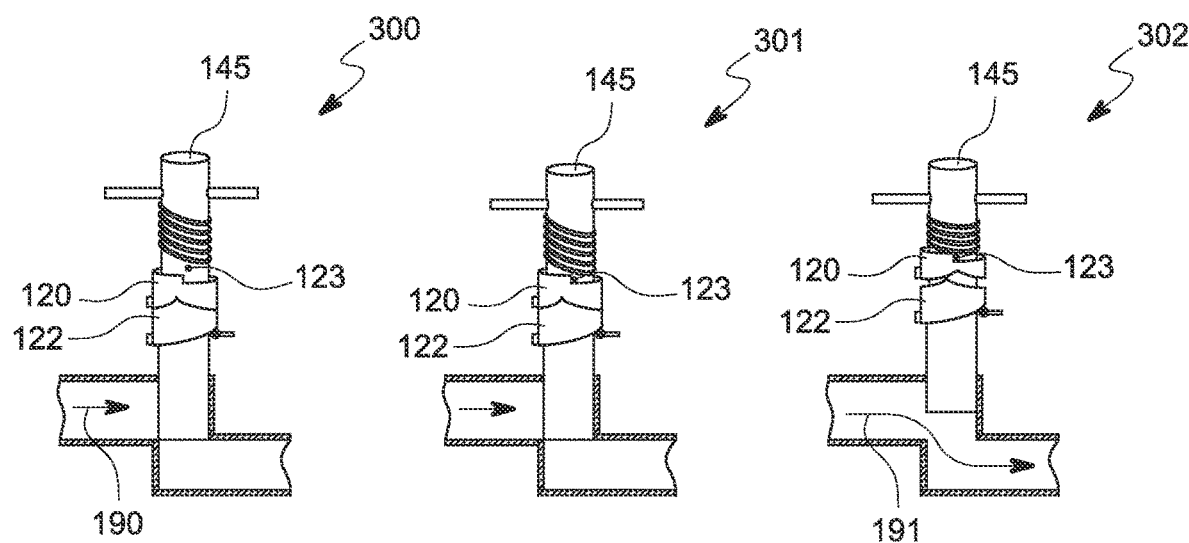
FIG. 3 is a schematic of certain embodiments of this invention showing a partial perspective and a cut away view of components of a valve system (also referred to as valve apparatus and/or a valve apparatus with a valve plug component) and portions of a first connecting apparatus of this invention in three states of operation with certain of the components illustrated and the water flow indicated with an arrow when in operation.

In particularly preferred embodiments, a first connecting apparatus (FIG. 2) comprises a double-cam mechanism 41, 42, 45 that is connected to the valve plug component, the double-cam mechanism 41, 42, 45 being capable of converting rotational movement of the minute dial 21 and the hour dial 22 to linear movement of the valve plug component 70 to open or close the valve system and control the flow of media through it. By configuring the cam guide slot 55 and 56 upward or downward, the valve can be used as normally closed or normally open applications, respectively. FIG. 3 illustrates still another embodiment of this component.

The valve apparatus of this invention converts a mechanically programmed information signal (comprising a certain time for a certain duration) to a mechanical action (open or close a plunger, plug or gate on the valve) and houses or is otherwise connected to or associated with a clock apparatus and an energizer apparatus (e.g., turbine apparatus) that in certain preferred embodiments generates mechanical energy used to, among other things, run or energize the clock.

In certain preferred embodiments, the valve converts sequential rotation movements (e.g., 2 sequential rotation movements) of dials to a linear movement that can open or close the valve gate (e.g., the valve's plunger stem is moved up or down to open or close the valve plug component), controlling the flow of the liquid (e.g., water) past the valve plug component and through the valve system. Other valve mechanisms and functions can be used, as is apparent to a person skilled in the art.

In certain preferred embodiments, a double-cam mechanism connected to the hour and minute dials converts the hour/minute rotation of the dials to a sequential linear movement to open/close the valve as programmed. In these embodiments of a normally closed valve, the rotational movement of the hour tabs and/or minute tabs is converted to linear movement through the double-cam mechanism. Starting from 7 pm in the example used above, the hour tab activates an hour cam to activate the minute cam. During the one-hour period between 7 pm and 8 pm, the six of the minute tabs turn the minute cam to a certain degree angle corresponding to 6 minutes and lift the center shaft of the valve up and keep the valve gate opened for 6 minutes. Other mechanisms and functions can be used, as is apparent to a person skilled in the art.

FIG. 1 and FIG. 2 show embodiments of a valve apparatus including a valve body 80, a plunger shaft 45, a valve plug component 70, and a seat for when the valve is off 71.

Figure 4:
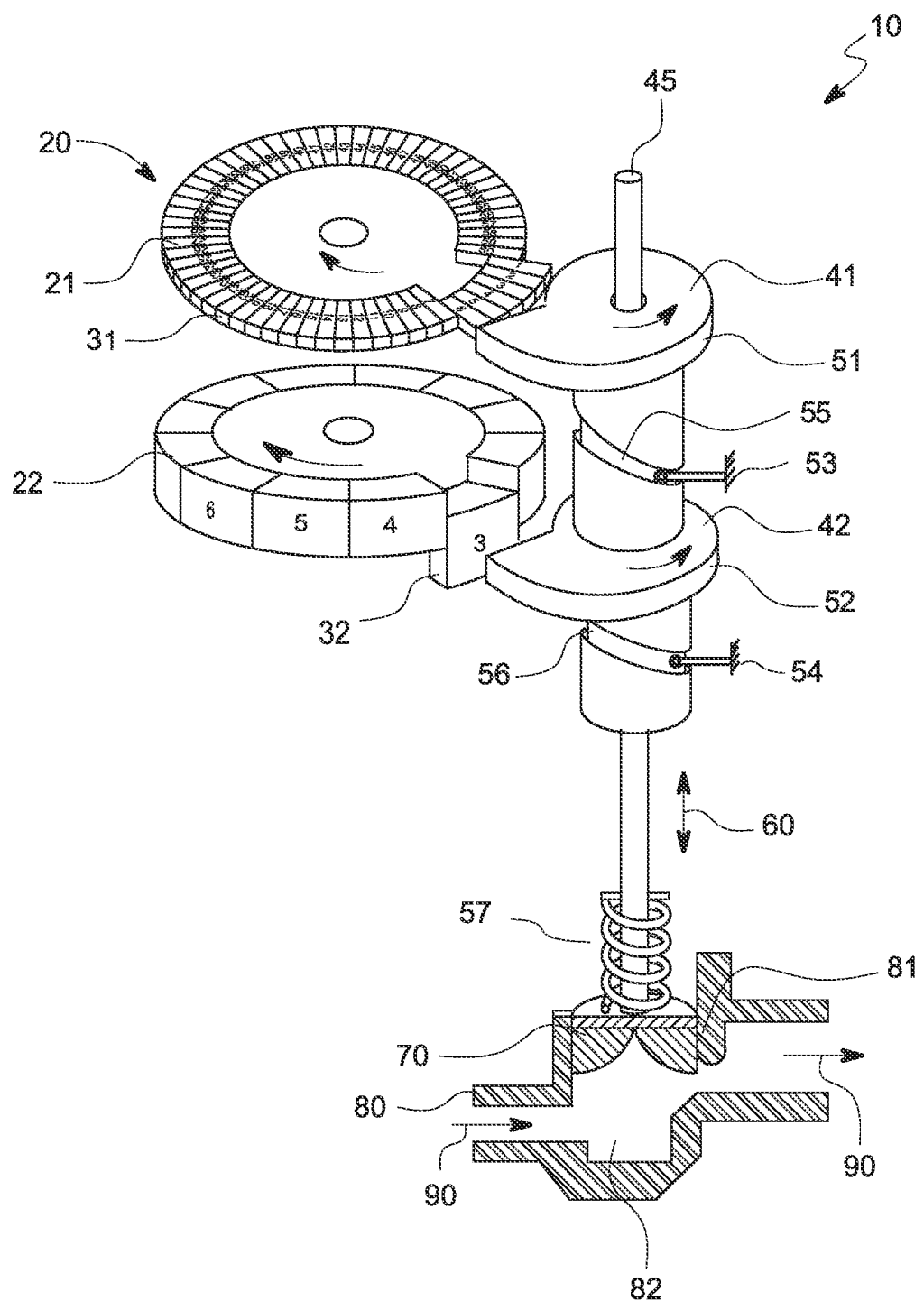
FIG. 4 is an alternative configuration to the embodiments shown in FIG. 2, wherein the cam rotation guide slots 55 and 56 are set downwards for normally open valve application.

FIG. 2 shows that in certain of these embodiments of a normally closed valve the cam shaft 45 is connected to a valve plug component 70 in the valve 80 and in operation when the valve plug component 70 is moved 60 to the open position area 81 by the cam shaft 45, water flows 90 through the valve 80. When the time set by the hour dial and the minute dial is over the minute tabs have rotated a certain angle and disengaged from the second cam, valve plug component 70 is returned to the closed position area 82 by the spring 57, water stops flowing through the valve 80 (not shown in FIG. 2). Other names for the cam shaft 45 and valve plug component 70 can be "plunger" and "plunger shaft" and other terms known by a person skilled in the art. A normally open valve can be configured by change the cam guide slots 55 and 56 downwards as shown in FIG. 4

The energizer apparatus (e.g., turbine) of this invention is placed inside the flow pipe connected to the valve or in some other position where it can extract energy from the flow of media through or past the valve. In certain preferred embodiments, when the flow media (e.g., water) passes through the valve, it drives the turbine impeller to rewind the clock's spring.

In certain preferred embodiments, a turbine is also connected to the clock and the water flow and it energizes the clock. In certain preferred embodiments, the turbine is installed inside the valve inlet pipe (or, alternatively, the body of the valve) with an extended shaft and gear set to wind the mainspring of the clock. An optional torque limiter disengages the turbine plates from its shaft when the clock mainspring is fully wound.

Other valve mechanisms and functions for the energizer apparatus (e.g., turbine) and how they interact with the clock can be used, as is apparent to a person skilled in the art.

FIG. 1 shows certain embodiments of this invention with a gear 103 (or multiple gears and/or one or more belts) that energizes the clock mainspring 24 by winding it with an energizer apparatus that is in these embodiments a turbine apparatus 100. The turbine apparatus 100 is also comprised of a gear 102 (or multiple gears and/or one or more belts) (also referred to as a second connecting apparatus) attached to a turbine shaft 101 that terminates with an impeller 105 in these embodiments. Also connected to the turbine shaft 101 is a torque limiter 104 that controls the amount of winding that can be applied to the clock mainspring 24. In operation, in these embodiments, the media flows 90 through the valve body 80 turning the turbine apparatus impeller 105 and the energy from this turning is transferred by the turbine shaft 101 and gears 102, 103 to the clock mainspring 24, winding it and thereby energizing it. When the clock mainspring 24 is fully winded, the torque limiter 104 inhibits or otherwise impedes the application of any more winding (any more energy) to the clock mainspring 24.

In particularly preferred embodiments, the turbine apparatus is connected to the clock apparatus by a second connecting apparatus. An example of such a second connecting apparatus is shown in FIG. 1 and it comprises one or more gears (or belts or other mechanical energy transfer components) such as gear 102 that engages with one or more components connected to the clock apparatus (e.g., gear 103 in FIG. 1) and the turbine shaft 101.

The second connecting apparatus connects the clock apparatus to the turbine apparatus and it can be comprised of a number of components familiar to a person of skill in the art, such as one or more shafts, connecting pins, gears and/or pulleys and other devices that are connected together to transfer mechanical energy from the turbine apparatus (e.g., impeller) to the clock apparatus. One such group of embodiments comprises a shaft connected to an impeller in the turbine apparatus, or another device that accepts energy from the impeller, which shaft is also connected to the clock apparatus, including by direct connection, or through one or more gears or pulleys or other devices that are capable of transferring or otherwise providing mechanical energy to the clock apparatus (e.g., winding a mainspring of the clock apparatus).

The subject matter of this disclosure is now described with reference to the following examples. These examples are provided for the purpose of illustration only, and the subject matter is not limited to these examples, but rather encompasses all variations which are evident as a result of the teaching provided herein.

Example I

An installation of a sprinkler system for a portion of a lawn is considered. The number of valve systems of this invention that will be needed is determined by the area of the lawn and the coverage by the sprinkler heads that will be used.

The embodiment of this invention that will be used is a valve system of this invention that has a single housing with a water inlet and a water outlet. The inlets and outlets are each connected to the pipelines from the water source and the sprinklers, respectively.

Inside the housing of the valve system of this invention is a valve apparatus comprising a plunger and a plug (i.e., valve plug component) at the end of the plunger. The valve apparatus also has a plunger shaft, which can also be called a cam shaft in certain embodiments with at least one cam, connected to the plug at the end.

Also in the housing of the valve system of this invention in this example is a clock apparatus comprising an hour dial, a minute dial, a mechanical clock mechanism with a clock mainspring, and a dial shaft that connects the hour dial and the minute dial to the mechanical clock mechanism. Also in the housing of the valve system in this embodiment is a double-cam mechanism that comprises a first cam connected to the hour dial and second cam connected to the minute dial. Each cam is connected to a cam shaft that interacts with the hour dial and the minute dial and the plunger to raise and lower the plunger and the plug at the end of the plunger in and out of a seat for the plug according to the dials, thereby opening and closing the valve at set time intervals, as shown and described for FIG. 2 above.

There are several ways the double-cam mechanism can interact with the hour dial, the minute dial, and the valve plug component. In one set of embodiments, the first cam is engaged with the hour dial and the second cam is capable of being engaged with the minute dial. For example, once the hour dial is set to operate with a particular time in hours, the first cam pushes the second cam up to reach and engage tabs on the minute dial. In these embodiments, when the hour dial is set to a particular number of hours, the first cam works sequentially with the second cam to enable the second cam to engage with the minute dial and open the valve plug component for the length of time set by the hour dial and the minute dial. At the end of the time set by the hour dial and the minute dial, the valve plug at the end of the shaft is returned to closed position by a positioning spring.

In another set of embodiments, the first cam is connected to and engaged with the hour dial and the second cam is connected to and engaged with the minute dial. In these embodiments, when the hour dial is set to a particular number of hours, the first cam works sequentially with the second cam to lock the second cam to a shaft that connects the double-cam mechanism to the valve plug component to open and close the valve plug component for the length of time set by the hour dial and the minute dial. At the end of the time set by the hour dial and the minute dial, the valve plug at the end of the shaft is returned to closed position by a positioning spring.

FIG. 3 illustrates an embodiment of this latter double-cam mechanism where the first (hour) cam 122 locks the second (minute) cam 120 to the shaft 145 when the valve is operational and open, letting media flow 191 through the valve body. In the first position 300, neither the first cam 122 nor the second cam 120 are triggered by their respective hour dial and minute dial. The valve is closed and there is no flow 190 of media. When the time set by an hour dial occurs (not shown in FIG. 3), the first cam 122 is rotated by the hour dial and it pushes the second cam 120 up to engage the shaft 145 at the pin 123 and the second position 301 is achieved. The second cam 120 is then rotated by a minute dial and the second cam 120 lifts the shaft 145 up, opening the valve so that the media can flow 191 through the valve, shown as position 302.

The housing of the valve system of this invention also contains an energizer apparatus that keeps the clock wound using a turbine apparatus to wind the clock's mainspring. The turbine has a turbine shaft that is turned by an impeller located within the outlet (or inlet or other portion) of the valve apparatus. When the clock is fully wound, a torque limiter disengages the impeller from the turbine shaft and thereby stops the turning of the turbine shaft that winds the clock, as shown and described for FIG. 1 above.

In operation, each valve system when installed in the piping lines in the lawn is first programmed by setting the hour dial and the minute dial of each valve system. At the programmed time, the cams lift the plunger and the plug out of the plug's seat in the valve and water flows through each of the valves to the sprinklers until the programmed time is over. While the water is flowing through the valves, the water flow turns a turbine shaft by turning a turbine impeller. The turbine shaft turns gears or other mechanical energy transfer components (e.g., belts) that wind the mainspring of the clock, keeping the clock operational.

In preferred embodiments of this invention, a control valve system for controlling the flow of media such as water is provided. The valve system comprises a clock apparatus that comprises a mechanical clock mechanism with an hour dial and a minute dial, the clock apparatus being connected to a valve plug component having an open position and a closed position, the clock apparatus being connected to the valve plug component by a first connecting apparatus, and which clock apparatus performs a timing function that controls the amount of time the valve plug component is in the open position and/or the closed position.

In these embodiments of this example, the first connecting apparatus functions to convert the rotational movement of the hour dial and the minute dial to a linear movement of the valve plug component to the open position and/or closed position and control the flow of media through the control valve system.

Also in these embodiments of this example, a turbine apparatus is provided. The turbine apparatus comprising a turbine shaft, an impeller on one end of the turbine shaft that is capable of being turned by the flow of media, the turbine apparatus being connected to the clock apparatus by a second connecting apparatus, and which turbine apparatus provides a mechanical energizing function that provides mechanical energy to a mainspring of the clock apparatus by using the second connecting apparatus.

In certain preferred embodiments of this example, the first connecting apparatus comprises a cam mechanism that is connected to the valve plug component, the cam mechanism having at least one cam being capable of converting rotational movement of the hour dial or the minute dial to linear movement of the valve plug component to the open position and/or the close position and control the flow of media through the control valve system.

In certain preferred embodiments of this example, the first connecting apparatus comprises a double-cam mechanism, the double-cam mechanism having a first cam being engaged with the hour dial, and a second cam being capable of being engaged with the minute dial, wherein when the hour dial is set to a particular time of the hour(s), the first cam works sequentially with the second cam to enable the second cam to engage with the minute dial and change the position of the valve plug component to the open position and/or the closed position for the length of time set by the hour dial and the minute dial.

In certain preferred embodiments of this example, the first connecting apparatus comprises a double-cam mechanism, the double cam mechanism having a first cam being engaged with the hour dial, and a second cam being engaged with the minute dial, wherein when the hour dial is set to a particular time of the hour(s), the first cam works sequentially with the second cam to lock the second cam to a shaft that connects the double-cam mechanism to the valve plug component to change the position of the valve plug component to the open position and/or closed position for the length of time set by the hour dial and the minute dial.

In certain preferred embodiments of this example, the hour dial is divided into no more than 24 hour sections and is connected to and capable of engaging a first cam for the number of hours set on the hour dial; and wherein the minute dial is divided into no more than 60 minute sections or group of minutes sections and is connected to and capable of engaging a second cam for the number of minutes set on the minute dial.

In certain preferred embodiments of this example, the turbine apparatus further comprises a torque limiter that is capable of disengaging the turbine shaft from the impeller when a mainspring of the clock apparatus is fully charged.

Example II

A particular set of embodiments of this invention can be described as follows. A control valve system for a water sprinkler is provided that is contained in a single, discrete housing. The control valve system has several components, including but not limited to:

(1) a water inlet that accepts water piped into the control valve system from a water source, and a water outlet that directs water towards the water sprinkler.

(2) a programmable clock apparatus that comprises a mechanical clock mechanism and a mechanical mainspring. The programmable clock apparatus is capable of opening and closing the control valve system by using a first connecting apparatus. In certain embodiments, the programmable clock apparatus includes an hour dial, a minute dial, and a repositioning spring.

(3) the first connecting apparatus functions to convert the rotational movement of an hour dial and a minute dial to a linear movement of a valve plug component to open and close the valve system and control the flow of media through it, and in some embodiments, it comprises a double-cam mechanism that is connected to the mechanical clock mechanism on one end and a valve plug component on the other end. The double-cam mechanism is capable of changing the position of the valve plug component from closed to open (for normally closed valve) or from open to closed (for normally open valve) in response to the programmable clock apparatus. In certain embodiments, the double-cam mechanism interacts with the hour dial and the minute dial of the programmable clock apparatus.

(4) a turbine apparatus comprising a turbine shaft that has a turbine impeller on one end that is capable of turning when water flows through the control valve system, wherein when the turbine impeller turns its rotational energy is transferred to the mechanical mainspring of the programmable clock apparatus.

In certain preferred embodiments of this example, the first connecting apparatus comprises a cam mechanism that is connected to the valve plug component, the cam mechanism has at least one cam being capable of converting rotational movement of the hour dial or the minute dial to linear movement of the valve plug component to open and close the valve system and control the flow of media through it.

In certain preferred embodiments of this example, the first connecting apparatus comprises a double-cam mechanism having a first cam being engaged with the hour dial, and a second cam being capable of being engaged with the minute dial, wherein when the hour dial is set to a particular time of the hour(s), the first cam works sequentially with the second cam to enable the second cam to engage with the minute dial and open and close the valve system and control the flow of media through it for the length of time set by the hour dial and the minute dial.

In certain preferred embodiments of this example, the first connecting apparatus comprises a double-cam mechanism having a first cam being engaged with the hour dial, and a second cam being engaged with the minute dial, wherein when the hour dial is set to a particular time of the hour(s), the first cam works sequentially with the second cam to lock the second cam to a shaft that connects the double-cam mechanism to the valve plug component to change the position of the valve plug component and open and close the valve system and control the flow of media through it for the length of time set by the hour dial and the minute dial.

In certain preferred embodiments of this example, the turbine apparatus further comprises a torque limiter that is capable of disengaging the turbine shaft from the impeller when a mainspring of the clock apparatus is fully charged.

In certain preferred embodiments of this example, the hour dial is divided into no more than 24 hour sections and is connected to and capable of engaging a first cam for the number of hours set on the hour dial; and wherein the minute dial is divided into no more than 60 minute sections or group of minutes sections and is connected to and capable of engaging a second cam for the number of minutes set on the minute dial.

Example III

In this example, the operation of a sprinkler system of this invention for a portion of a lawn is considered. The number of valve systems of this invention that will be needed is determined by the area of the lawn and the coverage by the sprinkler heads that will be used.

The embodiment of this invention that will be used is a valve system of this invention that has a single housing with a water inlet and a water outlet. The inlets and outlets are each connected to the pipelines from the water source and the sprinklers, respectively.

A method of controlling the flow of media such as water through a valve system comprising a valve plug component is provided in this example. The method comprises (a) programming a clock apparatus with the time the valve plug component is to be opened and/or closed, the clock apparatus comprising a mechanical clock mechanism with an hour dial and a minute dial; (b) converting the programming of the clock apparatus, using a first connecting apparatus, to the opening and/or closing of the valve plug component, the first connecting apparatus comprising a double-cam mechanism comprising a first cam and a second cam, the double-cam mechanism being connected to the valve plug component, wherein the double-cam mechanism is capable of converting rotational movement of the hour dial and the minute dial to linear movement of the valve plug component to open and close the valve and control the flow of media through it; and (c) energizing the clock apparatus by a turbine apparatus, the turbine apparatus comprising a turbine shaft, an impeller on one end of the turbine shaft that is capable of being turned by the flow of media, and optionally a torque limiter that is capable of disengaging the turbine shaft from the impeller (e.g., when a mainspring of the clock apparatus is fully charged), the turbine apparatus being connected to the clock apparatus by a second connecting apparatus, and which turbine apparatus provides a mechanical energizing function that provides mechanical energy to the clock apparatus using the second connecting apparatus.

In certain preferred embodiments of the method of the previous paragraph, in (a), the hour dial is capable of engaging a first connecting apparatus to move the valve plug component to the open position and/or the closed position for the number of hours set on the hour dial, and wherein the minute dial is capable of engaging the first connecting apparatus to move the valve plug component to the open position for the number of minutes set on the minute dial.

In certain embodiments of this example, the method of controlling the flow of media uses an hour dial that is divided into hour sections and is connected to and capable of engaging the first cam for the time of the hour(s) set on the hour dial. The minute dial is divided into minute sections or group of minutes sections (e.g., each mark designates one minute, each mark designates two minutes) and is connected to and capable of engaging the second cam.

In certain embodiments of this example, the method of controlling the flow of media uses a first connecting apparatus that comprises a cam mechanism that is connected to the valve plug component, the cam mechanism having at least one cam being capable of converting rotational movement of the hour dial or the minute dial to linear movement of the valve plug component to change the position of the valve plug component to the open position and/or the closed position and thereby control the flow of media past the valve plug component.

In certain embodiments of this example, the method of controlling the flow of media uses a first connecting apparatus that comprises a double-cam mechanism comprising a first cam and a second cam, the double-cam mechanism being connected to the valve plug component, wherein the double-cam mechanism is capable of converting rotational movement of the hour dial and the minute dial to linear movement of the valve plug component to change the position of the valve plug component to an open position and/or closed position and thereby control the flow of media past the valve plug component.

In certain embodiments of this example, the method of controlling the flow of media uses an hour dial that is divided into no more than 24 hour sections and is connected to and capable of engaging the first cam for the number of hours set on the hour dial; and wherein the minute dial is divided into no more than 60 minute sections or group of minutes sections and is connected to and capable of engaging the second cam for the number of minutes set on the minute dial.

Other Embodiments

Although the present invention has been described with reference to teaching, examples and preferred embodiments, one skilled in the art can easily ascertain its essential characteristics, and without departing from the spirit and scope thereof can make various changes and modifications of the invention to adapt it to various usages and conditions. Those skilled in the art will recognize or be able to ascertain using no more than routine experimentation, many equivalents to the specific embodiments of the invention described herein. Such equivalents are encompassed by the scope of the present invention.

What is claimed is:

1. A control valve system for controlling the flow of media such as water, said valve system comprising:

a clock apparatus that comprises a mechanical clock mechanism with an hour dial and a minute dial, the clock apparatus being connected to a valve plug component having an open position and a closed position, the clock apparatus being connected to the valve plug component by a first connecting apparatus, and which clock apparatus performs a timing function that controls the amount of time the valve plug component is in the open position and/or the closed position;

the first connecting apparatus functions to convert the rotational movement of the hour dial and the minute dial to a linear movement of the valve plug component to the open position and/or closed position and control the flow of media through the control valve system;

a turbine apparatus, the turbine apparatus comprising a turbine shaft, an impeller on one end of the turbine shaft that is capable of being turned by the flow of media, the turbine apparatus being connected to the clock apparatus by a second connecting apparatus, and which turbine apparatus provides a mechanical energizing function that provides mechanical energy to a mainspring of the clock apparatus by using the second connecting apparatus.

2. The control valve system of claim 1, wherein the first connecting apparatus comprises a cam mechanism that is connected to the valve plug component, the cam mechanism having at least one cam being capable of converting rotational movement of the hour dial or the minute dial to linear movement of the valve plug component to the open position and/or the close position and control the flow of media through the control valve system.

3. The control valve system of claim 1, wherein the first connecting apparatus comprises a double-cam mechanism, the double-cam mechanism having a first cam being engaged with the hour dial, and a second cam being capable of being engaged with the minute dial, wherein when the hour dial is set to a particular time of the hour(s), the first cam works sequentially with the second cam to enable the second cam to engage with the minute dial and change the position of the valve plug component to the open position and/or the closed position for the length of time set by the hour dial and the minute dial.

4. The control valve system of claim 1, wherein the first connecting apparatus comprises a double-cam mechanism, the double cam mechanism having a first cam being engaged with the hour dial, and a second cam being engaged with the minute dial, wherein when the hour dial is set to a particular time of the hour(s), the first cam works sequentially with the second cam to lock the second cam to a shaft that connects the double-cam mechanism to the valve plug component to change the position of the valve plug component to the open position and/or closed position for the length of time set by the hour dial and the minute dial.

5. The control valve system of claim 1, wherein the hour dial is divided into no more than 24 hour sections and is connected to and capable of engaging a first cam for the number of hours set on the hour dial; and wherein the minute dial is divided into no more than 60 minute sections or group of minutes sections and is connected to and capable of engaging a second cam for the number of minutes set on the minute dial.

6. The control valve system of claim 1, wherein the turbine apparatus further comprises a torque limiter that is capable of disengaging the turbine shaft from the impeller when a mainspring of the clock apparatus is fully charged.

7. A method of controlling the flow of media such as water through a valve system comprising a valve plug component having an open position and a closed position, said method comprising:

programming a clock apparatus with the time the valve plug component is to be opened and/or closed, the clock apparatus comprising a mechanical clock mechanism with an hour dial and a minute dial, wherein the hour dial is capable of engaging a first connecting apparatus to move the valve plug component to the open position and/or the closed position for the number of hours set on the hour dial, and wherein the minute dial is capable of engaging the first connecting apparatus to move the valve plug component to the open and/or closed position for the number of minutes set on the minute dial;

converting the programming of the clock apparatus using the first connecting apparatus that translates the rotational movement of the hour dial and the minute dial to a linear movement of the valve plug component to change the position of the valve plug component to the open position and/or the closed position and thereby control the flow of media past the valve plug component; and energizing the clock apparatus by a turbine apparatus, the turbine apparatus comprising a turbine shaft, an impeller on one end of the turbine shaft that is capable of being turned by the flow of media, the turbine apparatus being connected to the clock apparatus by a second connecting apparatus, and which turbine apparatus provides a mechanical energizing function that provides mechanical energy to the clock apparatus using the second connecting apparatus.

8. The method of controlling the flow of media of claim 7, wherein the first connecting apparatus comprises a cam mechanism that is connected to the valve plug component, the cam mechanism having at least one cam being capable of converting rotational movement of the hour dial or the minute dial to linear movement of the valve plug component to change the position of the valve plug component to the open position and/or the closed position and thereby control the flow of media past the valve plug component.

9. The method of controlling the flow of media of claim 7 wherein the first connecting apparatus comprises a double-cam mechanism comprising a first cam and a second cam, the double-cam mechanism being connected to the valve plug component, wherein the double-cam mechanism is capable of converting rotational movement of the hour dial and the minute dial to linear movement of the valve plug component to change the position of the valve plug component to an open position and/or closed position and thereby control the flow of media past the valve plug component.

10. The method of controlling the flow of media of claim 7, wherein the hour dial is divided into no more than 24 hour sections and is connected to and capable of engaging the first cam for the number of hours set on the hour dial; and wherein the minute dial is divided into no more than 60 minute sections or group of minutes sections and is connected to and capable of engaging the second cam for the number of minutes set on the minute dial.

11. The method of controlling the flow of media of claim 7, wherein the turbine apparatus further comprises a torque limiter that is capable of disengaging the turbine shaft from the impeller when a mainspring of the clock apparatus is fully charged.

12. A control valve system for a water sprinkler, said control valve system being contained in a single, discrete housing, and said control valve system further comprising:

a water inlet that accepts water piped into it from a water source, and a water outlet that directs water towards the water sprinkler when the control valve system is open;

a programmable clock apparatus comprising a mechanical clock mechanism and a mechanical mainspring, the programmable clock apparatus capable of opening and closing the control valve system by using a first connecting apparatus;

the first connecting apparatus functions to convert the rotational movement of an hour dial and a minute dial to a linear movement of a valve plug component to open and close the valve system and control the flow of media through it;

a turbine apparatus comprising a turbine shaft that has a turbine impeller on one end that is capable of turning when water flows through the control valve system, wherein when the turbine impeller turns its rotational energy is transferred to the mechanical mainspring of the programmable clock apparatus.

13. The control valve system of claim 12, wherein the first connecting apparatus comprises a cam mechanism that is connected to the valve plug component, the cam mechanism has at least one cam being capable of converting rotational movement of the hour dial or the minute dial to linear movement of the valve plug component to open and/or close the valve system and control the flow of media through it.

14. The control valve system of claim 12, wherein the first connecting apparatus comprises a double-cam mechanism having a first cam being engaged with the hour dial, and a second cam being capable of being engaged with the minute dial, wherein when the hour dial is set to a particular time of the hour(s), the first cam works sequentially with the second cam to enable the second cam to engage with the minute dial and open and/or close the valve system and control the flow of media through it for the length of time set by the hour dial and the minute dial.

15. The control valve system of claim 12, wherein the first connecting apparatus comprises a double-cam mechanism having a first cam being engaged with the hour dial, and a second cam being engaged with the minute dial, wherein when the hour dial is set to a particular time of the hour(s), the first cam works sequentially with the second cam to lock the second cam to a shaft that connects the double-cam mechanism to the valve plug component to change the position of the valve plug component and open and/or close the valve system and control the flow of media through it for the length of time set by the hour dial and the minute dial.

16. The control valve system of claim 12, wherein the turbine apparatus further comprises a torque limiter that is capable of disengaging the turbine shaft from the impeller when a mainspring of the clock apparatus is fully charged.

17. The control valve system of claim 12, wherein the hour dial is divided into no more than 24 hour sections and is connected to and capable of engaging a first cam for the time of the hour(s) set on the hour dial; and wherein the minute dial is divided into no more than 60 minute sections or group of minutes sections and is connected to and capable of engaging a second cam for the number of minutes set on the minute dial.

\* \* \* \* \*